March 17, 1936. E. G. KESLING 2,034,400
GEAR SHIFTING MECHANISM
Filed Aug. 7, 1933 3 Sheets-Sheet 1

Inventor
Elmer G. Kesling
by Tippey & Kingsland
His Attorneys.

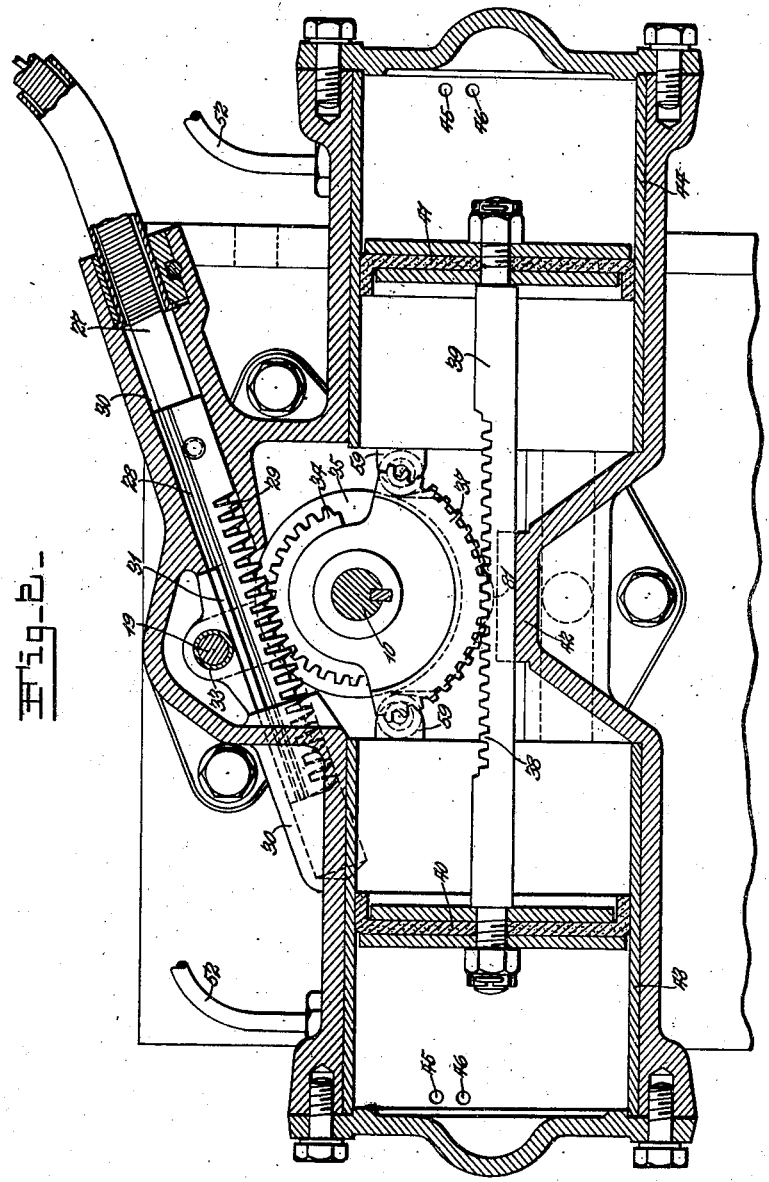

March 17, 1936.　　　　E. G. KESLING　　　　2,034,400
GEAR SHIFTING MECHANISM
Filed Aug. 7, 1933　　　3 Sheets-Sheet 3
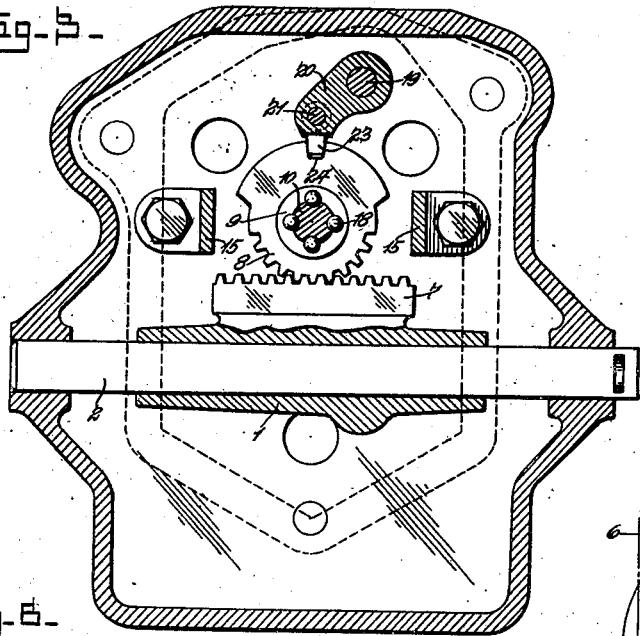
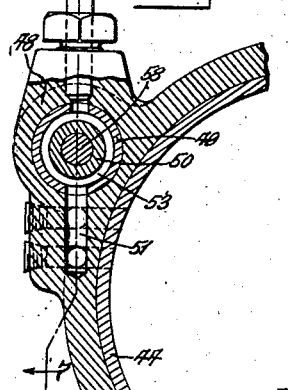
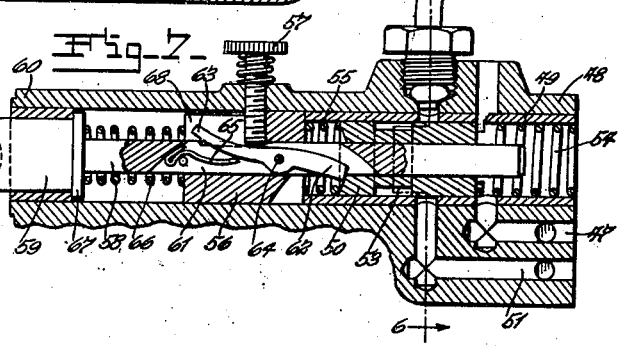
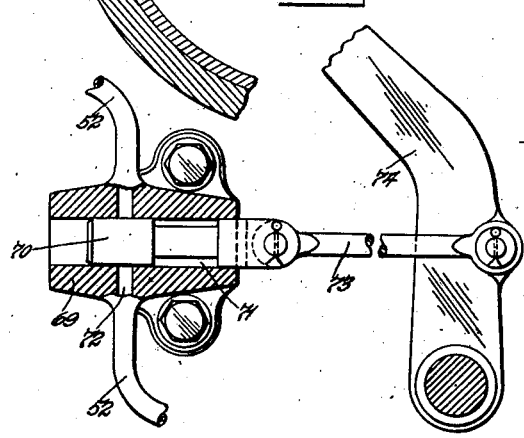
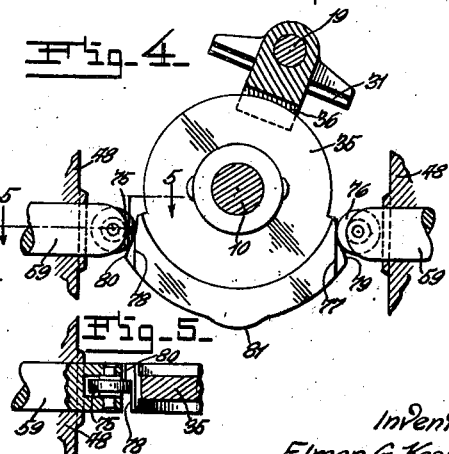
Inventor
Elmer G. Kesling Patented Mar. 17, 1936

2,034,400

UNITED STATES PATENT OFFICE 2,034,400

GEAR SHIFTING MECHANISM

Elmer G. Kesling, Bloomfield, Mo.

Application August 7, 1933, Serial No. 683,977

30 Claims. (Cl. 74—335)

This invention relates to gear shifting mechanism, and has special utility as a part of the transmission gearing of automobiles and other vehicles.

Objects of the invention are to provide a gear shifting mechanism having manual means for imparting the initial movements thereto in shifting operations, and means for utilizing the operation of the engine or motor to impart the final movements to the shifting operations without the application of additional manual force to effect such final shifting movements; to provide a construction whereby the energy or force of the engine or motor will continue to operate or function without interruption until the shifting operation has proceeded to a predetermined extent; to provide a construction and arrangement whereby a complete shifting may be manually performed if desired; and to provide means under control of one of the shiftable elements of the shifting mechanism for positively holding other elements of the shifting mechanism in their unoperated positions while the operating parts of the shifting mechanism are operated to perform their intended functions, and to hold the latter in their operated positions.

Other objects will be apparent from the following description, reference being made to the annexed drawings, in which—

Fig. 2 is a vertical longitudinal sectional view at right angles to the section of Fig. 1.

Fig. 3 is a vertical longitudinal section approximately on the line 3—3 of Fig. 1.

Fig. 4 is a vertical sectional view approximately on the line 4—4 of Fig. 1, showing parts of the devices for utilizing the power or energy of the engine or motor to complete the final shifting movements.

Fig. 5 is a sectional view on the line 5—5 of Fig. 4.

Fig. 6 is a sectional view approximately on the line 6—6 of Fig. 7.

Fig. 7 is a sectional view approximately on the line 7—7 of Fig. 6.

Fig. 8 is a view showing the device operated by the clutch pedal for controlling operation of the shift mechanism by the operation of the motor.

Figure 1:
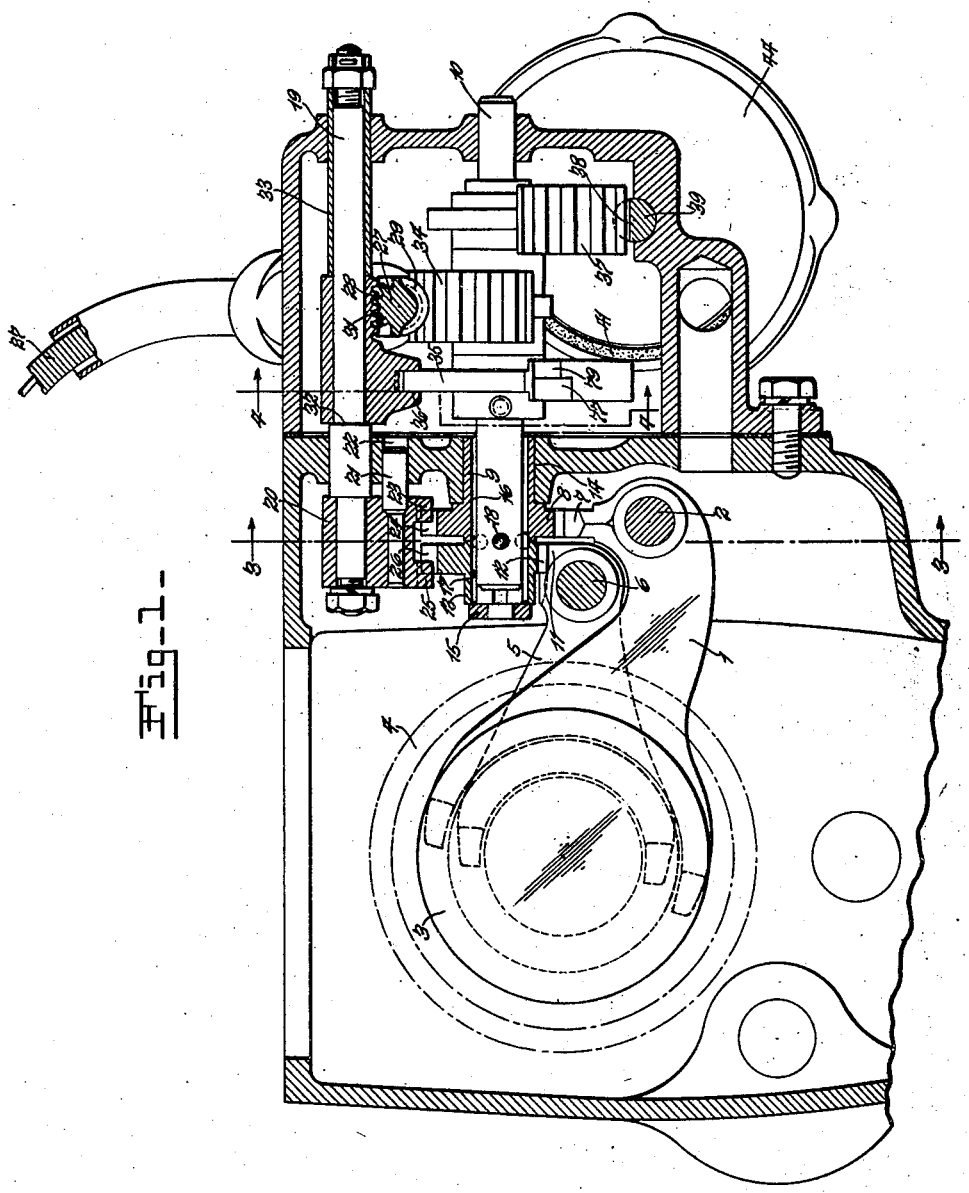
Fig. 1 is a vertical transverse sectional view of the gear case and a part of the shifting mechanism.

A shifter fork 1 is supported by a spindle 2 for lateral shifting movements, and is cooperatively engaged with the hub 3 of a laterally shiftable gear 4. The shifter fork is shiftable laterally in one direction from a starting position to shift the gear 4 to reverse position, and is shiftable laterally in the opposite direction from said starting position to shift the gear 4 to forward low speed position.

The shifter fork 5 is supported by the spindle 6 for lateral shifting movements from a starting position, and is cooperatively engaged with a laterally shiftable device (not shown) for intermediate and high speed.

The hub of the fork 1 is rigid with a rack 7 in permanent mesh with a segmental rack 8 rigid with a hub 9 mounted on a spindle 10 supported for longitudinal and turning movements; while the hub of the fork 5 is rigid with a rack 11 in permanent mesh with a segmental rack 12 rigid with a hub 13 which is also supported by the spindle 10 at one end of the hub 9. The hub 9 is mounted in a bearing 14 permitting turning movements of said hub and preventing longitudinal movements in one direction. One end of the hub 13 engages the end of the hub 9 opposite from the bearing 14, and the opposite end of said hub 13 is engaged by a strap 15. Thus the parts 14 and 15 prevent longitudinal movements of the hubs 9 and 13 and permit free turning movements of said hubs.

A number of longitudinal grooves 16 are formed on the inside of the hub 9, and a number of similar longitudinal grooves 17 are formed on the inside of the hub 13. These grooves 16 and 17 receive key elements 18 partially embedded in the spindle 10. In its starting position, the spindle 10 supports the key elements 18 engaged in both the grooves 16 and 17, but is shiftable longitudinally in either direction from said starting position to disengage the key elements from the grooves 17 while supporting them engaged in the grooves 16, or to disengage said key elements from the grooves 16 and engage them only in the grooves 17.

When the key elements 18 are engaged in the grooves 16 only, the spindle 10 may be turned in either direction and will thereby turn the rack 8 and shift the fork 1 according to the direction of turning of the spindle 10 to move the gear 4 to reverse position or to low speed position. During this turning movement of the spindle 10, the rack 12 is locked against operation, thereby positively holding the fork 5 unoperated. When the key elements 18 are engaged in the grooves 17 only, the spindle 10 may be turned in either direction and will thereby turn the rack 12 and shift the fork 5 according to the direction of turning of the spindle 10 to move the cooperating device (not shown) to either position to which it is shiftable by said fork. During this turning movement of the spindle 10, the rack 8 is locked against operation, thereby positively holding the fork 1 unoperated.

A rod 19 is supported by the gear housing for longitudinal movements, and an arm 20 is attached to said rod 19 for longitudinal movement with said rod. The arm 20 is held from turning by a guide 21 connected with said arm and extending into a hole 22 in an adjacent part of the housing. The arm 20 is formed with a rigid finger 23 movable into and out of a notch 24 in an adjacent part of the rack 8, and is formed with another rigid finger 25 movable into and out of a notch 26 in an adjacent part of the rack 12.

In the starting position of the rod 19, the fingers 23 and 25 are engaged in the notches 24 and 26, respectively. The rod 19 is shiftable longitudinally in one direction from said starting position to disengage the finger 23 from the notch 24 and thereby permit the rack 8 to be turned while the rack 12 is positively held in its unoperated position. And the rod 19 is shiftable longitudinally in the opposite direction from said starting position to disengage the finger 25 from the notch 26 and thereby permit the rack 12 to be turned while the rack 8 is positively held in its unoperated position.

It is obvious that only one of the said racks 8 or 12 can be turned at any one time, and that when either one of the said racks 8 or 12 is turned from the starting position in either direction the rod 19 is held against longitudinal movement by the finger 23 or the finger 25 abutting against the adjacent side of rack 8 or 12 as the case may be.

A shaft 27 is rigid with a series of longitudinal teeth 28 extending parallel with the axis of said shaft and with a series of teeth 29 extending for a part of the distance around the periphery of the shaft 27. The shaft 27 is supported for both longitudinal and turning movements, and the portion of said shaft on which the teeth 28 and 29 are formed is mounted in a guide 30, permitting said longitudinal and turning movements. The teeth 28 are in constant mesh with a rack 31 supported by the rod 19 for longitudinal movements with said rod and held from moving longitudinally relative to said rod by a shoulder 32 and a sleeve 33. Thus, turning movements of the shaft 27 will move the rod 19 longitudinally in one direction or the other from the starting position of said rod, depending upon the direction, in which the shaft 27 is turned, and will thereby shift the fingers 23 and 25 in the manner described. Obviously, return turning movement of the shaft 27 to its starting position will shift the rod 19 and thereby the fingers 23 and 25 to their starting or unoperated positions.

The teeth 29 are in constant mesh with an arcuate rack 34 attached to the spindle 10. Clearly, longitudinal movements of the shaft 27 in either direction from its starting position will impart a turning movement to the spindle 10 in one direction or the other from its starting position, depending upon the direction in which the shaft 27 is moved. Longitudinal movement of the shaft 27 will not operate the rod 19 nor the fingers 23 and 25, nor will turning movements of said shaft 27 operate the rack 34.

The spindle 10 is moved longitudinally by the rod 19. A disc 35 rigid on the spindle 10 engages in a notch 36 (Figs. 1 and 4) in the hub of the rack 31. Therefore, longitudinal movement of the rod 19 in either direction from its starting or unoperated position will move the spindle 10 longitudinally in the same direction; and movement of the spindle 10 will move the key elements 18 into and out of engagement with the respective hubs 9 and 13, depending upon the direction in which the spindle 10 is moved from its starting or unoperated position.

An arcuate rack 37 rigid with the spindle 10 is in permanent mesh with an elongated rack 38 formed on or rigid with a longitudinally movable connecting rod 39 having its opposite ends attached to pistons 40 and 41, respectively, and its intermediate portion supported and guided by a bearing 42. The rack 37 will not be disengaged from the rack 38 when the spindle 10 is moved longitudinally, but the spindle 10 may be moved longitudinally without disturbing or operating the rack 38 or the pistons 40 and 41. However, turning movements of the spindle 10 in either direction from its starting or unoperated position will move the rod 39, and thereby the pistons 40 and 41, in one direction or the other, depending upon the direction in which the spindle 10 is turned. Further, operation of either of the pistons 40 or 41 by the power of the motor or engine will turn the spindle 10 in one direction or the other, depending upon the direction of operation of said pistons.

The pistons 40 and 41 are operative in cylinders 43 and 44, respectively, each having an air inlet port 45 and a suction or air withdrawal port 46. Each of the cylinders 43 and 44 is equipped with valve mechanism controlling the ports 45 and 46 and co-ordinated with the remainder of the invention in order to cause the engine or motor to impart the final movements to the shifting mechanism after the initial movements have been imparted to the shifting mechanism manually. These two valve mechanisms are of duplicate construction, so that a description and illustration of one will suffice for both.

The air inlet port 45 for each cylinder opens into an angular port 47 through a valve housing 48 containing a sleeve 49 in which the valve body 50 is operatively mounted. The air outlet or suction port 46 for each cylinder opens into an angular port 51 through the valve housing 48 and the sleeve 49 and communicates with a suction tube 52 connected up with the engine or motor (not shown) in such a way that, when the engine or motor is operating, a suction is created through the tube 52 and, when the port 51 is open, to the inside of the communicating cylinder 43 or 44. When the port 51 communicating with either cylinder is open, the corresponding port communicating with the other cylinder is closed, so that there is a suction withdrawal of air from only one of said cylinders at any one time. And, when either port 51 is open, the corresponding port 47 is closed, while the port 47 communicating with the other cylinder remains open, thus permitting proper operation of either of the pistons 40 or 41 by the suction created by the engine or motor.

Each valve body 50 is formed with a circumferential groove 53 which, in the unoperated position of the valve, is out of communication with the port 51, said port 51 being closed by the body of the valve. Each valve is moved to its closed or unoperated position after each operation and is yieldingly held in such unoperated position by a spring 54 acting against one end of the valve, while the opposite end of the valve seats against the yielding abutment shown as a spring 55. The spring 55 seats against an abutment 56 held stationary in the valve housing by a member 57.

A rod comprising a reduced portion 58 extending for sliding movements through the abutment 56 and through the valve 50, and an enlarged portion 59 supported in a bearing 60, has a longitudinal slot 61 in said reduced portion. A pawl comprising a head 62 and a tail 63 is supported in the slot 61 by a pivot pin 64, and is actuated by a spring 65 to hold the head 62 in yieldable engagement with the end of the valve 50. The tail 63 of this pawl operates against the inner end of the member 57 in such a way that the rod 58—59 may be moved longitudinally into the valve housing 48 for a certain distance before the head 62 of the pawl will be released from the valve 50. This inward movement of the rod 58—59 will move the valve 50 inwardly a sufficient distance to close the port 47, and to open the port 51 by placing the groove 53 in registration with said port 51. Further or additional inward movement of the rod 58—59 will cause the member 57 to disengage the head 62 of the pawl from the valve 50, whereupon the spring 54 will immediately move said valve to its initial or unoperated position in which the port 47 is open and the port 51 is closed, and the head 62 will again engage the valve 50.

A spring 66 has its inner end engaging the abutment 56 and its opposite end engaging the end of a circumferential shoulder 67 at the union of the parts 58 and 59, thus utilizing the power and energy of said spring to move the longitudinally movable rod outwardly to a position in which the shoulder 67 engages the end of the bearing 60. In these longitudinal movements of the rod, the pawl tail 63 operates in a slot 68 in the abutment 56 and prevents the rod from turning.

The tube 52 opens through a valve casing 69 (Fig. 8) supporting a longitudinally movable valve 70 having a circumferential groove 71 adapted to be brought into and out of registration with the passage 72 through the valve casing. A link 73 has one end connected with the valve 70 and the opposite end connected with the clutch pedal 74 so that, when the clutch pedal is operated toward the left (Fig. 8), the valve groove 71 will be brought into registration with the passage 72 and permit the suction of the engine or motor to operate through the tube 52, port 51 and port 46 to withdraw air from one or the other of the cylinders 43 or 44.

One of the rod ends 59 supports a roller 75 and the other rod end 59 supports a roller 76. Attached to the spindle 10 are a reverse cam 77, a low speed cam 78, an intermediate speed cam 79 and a high speed cam 80. In the unoperated position of the spindle 10, these cams are out of effective engagement with the rollers 75 and 76, leaving the rods 58—59 in their outwardly extended positions in which the ports 51 are closed by the valves 50 while the ports 47 are open.

In operating the shifting mechanism for reverse, the shaft 27 is turned in a direction of reverse and low speed selection to move the rod 19 (Fig. 1) to a position in which the finger 23 is disengaged from the notch 24 and in which the finger 25 is engaged in the notch 26. This releases the rack 8 and locks the rack 12 against operation. This longitudinal shifting movement of the rod 19 also moves the spindle 10 longitudinally, bringing the reverse cam 77 into cooperative relation with the roller 76. This longitudinal movement of the spindle 10 also moves the key elements 18 from engagement in the grooves 17 into engagement with the grooves 16 only, so that when the spindle 10 is turned, a turning movement will be imparted to the rack 8 and a shifting movement to the fork 1. A turning movement is imparted to the spindle 10 by moving the shaft 27 longitudinally in an outward direction (Fig. 2), causing the reverse cam 77, by operation against the roller 76, to move the rod 58—59 longitudinally into the valve housing 48. This inward movement of the rod causes the pawl head 62 to move the valve 50 to a position in which the port 47 is closed and the port 51 is open, thus permitting the suction of the engine or motor to operate through the tube 52 and ports 51 and 46 into the cylinder 43, it being understood that the clutch pedal 74 had been operated preparatory to the shifting operation. Near the end of the turning movement of the reverse cam 77, the high point 81, which is common to all of the cams 77, 78, 79 and 80, is operated against the roller 76, thereby moving the rod 58—59 far enough to disengage the pawl head 62 from the valve 50 by operation of the pawl tail 63 against the member 57. When this occurs, the spring 54 operates immediately to move the valve 50 to the position shown in Fig. 7 of the drawings, in which the air-inlet port 47 is open and the suction port 51 is closed.

In order to shift into low speed, the shaft 27 is moved longitudinally in the opposite direction from that in which said shaft was moved in making the reverse shift, and this turns the spindle 10 in the opposite direction, causing the low speed cam 78 to operate against the roller 75 and thereby operate the valve mechanism controlling the cylinder 44 in order to close the air inlet port 47 to said cylinder and to open the suction port 51, permitting the suction of the engine to cause operation of the piston device 41 to impart a further and final turning movement to the spindle 10 and thereby impart the final shifting movement to the fork 1. The final turning movement of the spindle 10 causes the high cam point 81 to operate the rod 58—59 far enough to effect release of the pawl head 62 from the valve 50, whereupon the spring 54 immediately operates the valve 50 to open the port 47 and close the port 51.

To shift to immediate speed the shaft 27 is moved longitudinally to bring the notches 24 and 26 into alinement and is then turned in the direction of intermediate and high speed selection to move the rod 19 longitudinally to disengage the finger 25 from the notch 26, thereby releasing the rack 12 while the finger 23 locks the rack 8. The longitudinal movement of the rod 19 also moves the spindle 10 longitudinally and disengages the key elements 18 from the grooves 16 and engages said key elements in the grooves 17 only. Then the shaft 27 is moved longitudinally and the spindle 10 is turned thereby, thus imparting an initial lateral shifting movement to the fork 5 and an initial turning movement to the intermediate cam 79, causing said cam 79 quickly to move the cooperatively related rod 58—59 longitudinally into the valve housing 48. This longitudinal movement of the rod 58—59 into the valve housing 48 quickly moves the valve 50 to position to close the air inlet port 47 and to open the suction port 51.

At this point the suction of the engine is from the cylinder 43, thereby operating the piston 40 to impart a final turning movement to the spindle 10, and thereby a final shifting movement to the fork 5 and the device operated thereby. When the high point 81 of the cam 79 engages and operates the roller 76, the rod 58—59 is moved a further distance sufficient to cause the pawl tail 63, by operating against the member 57, to disengage the pawl head 62 from the valve 50. The spring 54 then immediately moves the valve 50 to open the air inlet port 47 to the cylinder 43 and to close the suction port 51 opening from said cylinder 43.

In shifting to high speed position, the high speed cam 80 is brought into cooperative relation to the roller 75, the finger 23 being engaged in the notch 24, thereby locking the rack 8, while the finger 25 is disengaged from the notch 26, thus permitting operation of the rack 12. Longitudinal movement of the shaft 27 in the opposite direction from the direction in which said shaft 27 was moved to impart effective movement to the cam 79 causes the cam 80 to operate against the roller 75 and thereby move the rod 58—59 longitudinally into the valve housing 48 to operate the valve 50 to position to close the air inlet port 47 and open the suction port 51, permitting the suction of the engine to operate the piston 41 and thereby impart final movements to the shifting mechanism including the spindle 10 and the fork 5. During the final movement of the cam 80, the high point 81 moves the rod 58—59 inwardly far enough to effect release of the pawl head 62 from the valve 50 by operation of the pawl tail 63 against the member 57 in the manner heretofore described. Thereupon, the spring 54 immediately moves the valve 50 to position to open the air inlet port 47 and to close the suction port 51.

During each of these shifting operations, it is understood that the valve 70 is open, so that there will be effective suction operation through the tube 52, the communicating port 51 and the suction port 46, to the corresponding cylinder 43 or 44. In each of these shifting operations the vacuum mechanism functions to assist the manual mechanism in the shifting movements of the gear shifter elements and I believe such combinations and operations are broadly new.

It must now be apparent that the shaft 27 cannot be turned nor the rod 19 moved longitudinally for a selecting operation when the notches 24 and 26 are disalined, or rather when it is impossible for said fingers 23 and 25 to enter said notches 24 and 26 respectively; and that it is impossible to move the shaft 27 longitudinally to turn the spindle 10 in a gear shifting operation until the full selection has been made by turning the shaft 27 to make a selection in the manner herein described. As a necessary consequence the locking of either of the gears 8 or 12 locks the corresponding fork 1 or 5 against any shifting movement without the use of auxiliary or supplement devices for that purpose.

Further, it is now clear that this invention obtains all of its intended objects and purposes efficiently and easily, and is free from many complicated features characteristic of some gear shifting mechanisms. The construction, arrangement and combination of elements of the device may be varied as widely as the scope of equivalents will permit, without departure from the nature and principle of the invention, and I contemplate such variations as may be desirable or permissible.

I claim:

1. Gear shifting mechanism of the character described comprising a spindle supported for longitudinal and turning movements, a rod supported for longitudinal movements only, shifting devices operative by turning movements of said spindle after said spindle has been moved longitudinally, means for preventing turning of said spindle until after said rod has been moved longitudinally, and a shaft supported for turning and longitudinal movements and operatively connected with said rod to move said rod longitudinally when said shaft is turned and operatively connected to said spindle to turn said spindle when said shaft is moved longitudinally.

2. Gear shifting mechanism of the character described comprising a spindle supported for longitudinal and turning movements, a rod supported for longitudinal movements only, devices controlled by said rod for preventing the turning of said spindle until said rod has been moved longitudinally, and mechanism having operative connection with said rod and said spindle for moving said rod and said spindle longitudinally simultaneously and thereafter turning said spindle.

3. Gear shifting mechanism of the character described comprising a spindle supported for longitudinal and turning movements, mechanism supported for longitudinal movements only for moving said spindle longitudinally and controlling subsequent turning of said spindle, and mechanism for operating said first named mechanism to move said spindle longitudinally and thereafter to turn said spindle.

4. Gear shifting mechanism of the character described comprising a spindle supported for longitudinal and turning movements, mechanism supported for longitudinal movements only for moving said spindle longitudinally and controlling subsequent turning of said spindle, means limiting extent of longitudinal movement of said mechanism and thereby said spindle, mechanism for operating said first named mechanism to move said spindle longitudinally and thereafter impart an initial turning movement to said spindle, and other mechanism for thereafter imparting final turning movement to said spindle.

5. Gear shifting mechanism of the character described comprising a spindle mounted for longitudinal and turning movements, mechanism operative in one direction to move said spindle longitudinally and thereafter operative in another direction to impart a turning movement to said spindle, means for preventing operation of said mechanism to turn said spindle until after said spindle has been moved longitudinally, and means other than said mechanism for imparting final turning movement to said spindle after said mechanism has imparted a turning movement to said spindle.

6. Gear shifting mechanism of the character described comprising a spindle supported for longitudinal and turning movements, a rod supported for longitudinal movements only, means for preventing turning movements of said rod, devices controlled by said rod for preventing the turning of said spindle until said rod has been moved longitudinally, mechanism having operative connection with said rod and said spindle for moving said rod and thereby said spindle longitudinally simultaneously, and means operative by said mechanism for turning said spindle after said spindle has been moved longitudinally as aforesaid.

7. Gear shifting mechanism of the character described comprising a spindle supported for longitudinal and turning movements, a shaft supported for longitudinal and turning movements, devices controlled by said shaft for preventing the turning of said spindle until said shaft has been turned, gearing operated by said shaft for imparting an initial turning movement to said spindle by longitudinal movement of said shaft, and mechanism other than said shaft for imparting final turning movement to said spindle after said spindle has been initially turned by said shaft as aforesaid.

8. Gear shifting mechanism of the character described comprising a spindle supported for longitudinal and turning movements, a shaft supported for longitudinal and turning movements, devices controlled by said shaft for preventing the turning of said spindle until after said shaft has been turned, gearing operated by said shaft for imparting an initial turning movement to said spindle by longitudinal movement of said shaft, mechanism other than said shaft for imparting final turning movement to said spindle after said spindle has been initially turned by said shaft as aforesaid, and devices controlled by said spindle timing the operation of said last named mechanism.

9. Gear shifting mechanism of the character described comprising a spindle supported for longitudinal turning movements, mechanism supported for longitudinal movements only for moving said spindle longitudinally and controlling subsequent turning of said spindle, gearing operated by said mechanism for imparting an initial turning movement to said spindle after said spindle has been moved longitudinally as aforesaid, and additional mechanism for imparting final turning movement to said spindle after said initial turning movement has been performed.

10. Gear shifting mechanism of the character described comprising a spindle supported for longitudinal turning movements, mechanism supported for longitudinal movements only for moving said spindle longitudinally and controlling subsequent turning of said spindle, gearing operated by said mechanism for imparting an initial turning movement to said spindle after said spindle has been moved longitudinally as aforesaid, additional mechanism for imparting final turning movement to said spindle after said initial turning movement has been performed, and devices controlled by said spindle timing the operation of said additional mechanism to impart said final turning movement to said spindle.

11. Gear shifting mechanism of the character described comprising a shaft supported for longitudinal and turning movements, gear shifter elements, a spindle supported for longitudinal and turning movements, gearing operative by turning movements of said spindle to move said gear shifter elements selectively, mechanism for moving said spindle longitudinally to selective gear shifting positions, gearing operative by said mechanism to turn said spindle initially, and additional mechanism for imparting final turning movements to said spindle to complete final movement of said shifter elements.

12. Gear shifting mechanism of the character described comprising a shaft supported for longitudinal and turning movements, gear shifter elements, a spindle supported for longitudinal and turning movements, gearing operative by turning movements of said spindle to move said gear shifter elements selectively, mechanism for moving said spindle longitudinally to selective gear shifting positions, gearing operative by said mechanism to turn said spindle initially, additional mechanism for imparting final turning movements to said spindle to complete final movement of said shifter elements, and devices controlled by said spindle timing the operation of said additional mechanism.

13. Gear shifting mechanism of the character described comprising a shaft supported for longitudinal and turning movements, gear shifter elements, gearing for operating said gear shifter elements, manual mechanism for imparting an initial movement to said gearing to impart a partial shifting movement to said gear shifter elements, and additional mechanism for imparting final movement to said gearing after said initial movements have been imparted by said manual mechanism in order to complete final movement of said shifter elements.

14. Gear shifting mechanism of the character described comprising a shaft supported for longitudinal and turning movements, gear shifter elements, gearing for operating said gear shifter elements, manual mechanism for imparting an initial movement to said gearing to impart a partial shifting movement to said gear shifter elements, additional mechanism for imparting final movement to said gearing after said initial movements have been imparted by said manual mechanism in order to complete final movement of said shifter elements, and means controlled by said gearing timing and controlling the operation of said additional mechanism and preventing operation of said additional mechanism until after said initial movement of said gearing has been made.

15. Gear shifting mechanism of the character described comprising shifter elements mounted for lateral shifting movements, manual mechanism operative to move said shifter elements selectively for an initial portion of their shifting movements, suction mechanism cooperating with said manual mechanism to impart final shifting movements to said shifter elements, and means preventing operation of said suction mechanism until after said manual mechanism has been operated as aforesaid.

16. Gear shifting mechanism of the character described comprising laterally movable shifter elements, gear devices for shifting said shifter elements selectively, an actuator, manual means for operating said actuator to operate said gear devices selectively through an initial portion of their movement, and other mechanism for operating said actuator and thereby said gear devices through their final movements only.

17. Gear shifting mechanism of the character described comprising laterally movable shifter elements, gear devices for shifting said shifter elements selectively, an actuator, manual means for operating said actuator to operate said gear devices selectively through an initial portion of their movement, other mechanism for operating said actuator and thereby said gear devices through their final movements only, and means controlled by said actuator timing the operation of said additional mechanism.

18. Gear shifting mechanism of the character described comprising shifter elements, connections for moving said shifter elements respectively, an actuator for operating said connections selectively, manual means for positioning said actuator for selective operation of said connections and for imparting initial movement to said connections, and suction mechanism for operating said actuator to impart final movements only to said connections.

19. Gear shifting mechanism of the character described comprising shifter elements, connections for moving said shifter elements respectively, an actuator for operating said connections selectively, manual means for positioning said actuator for selective operation of said connections and for imparting initial movement to said connections, other mechanism for operating said actuator to impart final movement only to said connections, and devices controlled by said actuator timing the operation of said other mechanism.

20. Gear shifting mechanism of the character described comprising shifter elements, connections for moving said shifter elements respectively, an actuator for operating said connections selectively, manual means for moving said actuator to positions to operate said connections selectively and to impart initial actuating movement to said actuator and to return said actuator to neutral position after each complete operation thereof, and suction mechanism for operating said actuator to impart final movements to said connections after said initial movements only have been performed by said manual means as aforesaid.

21. A gear shifting mechanism of the character described comprising gear shifter elements, an actuator supported for longitudinal and turning movements, a member supported for longitudinal movements only for moving said actuator longitudinally to selective gear shifting positions, gearing operative by said actuator to move said gear shifter elements selectively, and a shaft supported for turning movements to operate said member and for longitudinal movements to turn said actuator.

22. Gear shifting mechanism of the character described comprising gear shifter elements, manual mechanism for selecting and imparting positive shifting movements to said gear shifter elements, and suction mechanism controlled by said manual mechanism for assisting the said manual mechanism in the final operations only of the shifting movements of said gear shifter elements.

23. Gear shifting mechanism of the character described comprising gear shifter elements mounted for selective gear shifting movements, a spindle supported for rocking in either direction after longitudinal movements in opposite directions from an intermediate position, means for shifting said gear shifter elements selectively by rocking said spindle after said spindle has been moved from intermediate position, manual mechanism for moving said spindle from intermediate position and for rocking said spindle and thereby shifting said gear shifter elements, and additional mechanism for assisting said manual mechanism in the final operations thereof to shift said gear shifter elements.

24. Gear shifting mechanism of the character described comprising gear shifter elements mounted for selective gear shifting movements, a spindle supported for longitudinal movements in opposite directions from an intermediate position, means for shifting said gear shifter elements selectively by said spindle after said spindle has been moved from intermediate position, manual mechanism for moving said spindle from intermediate position and for operating said spindle and thereby said gear shifter elements, and suction mechanism controlled by said spindle for assisting said manual mechanism in the final operations only thereof to shift said gear shifter elements.

25. Gear shifting mechanism of the character described comprising gear shifter elements, an actuator mounted for selectively moving said shifter elements, suction mechanism connected to said actuator for operating said actuator to move said shifter elements, a valve controlled by said actuator for regulating said suction mechanism, and other means for initially controlling said actuator.

26. Mechanism of the character described comprising shifter elements, an actuator for shifting said shifter elements selectively, operating means operatively connected to said actuator for selecting and moving said actuator to shift said shifter elements, additional mechanism operatively connected to said actuator for assisting said operating means in moving said actuator, and a valve controlled by said actuator for regulating said additional mechanism.

27. Mechanism of the character described comprising selective gear shifting elements, operating means including an actuator engageable to shift said elements, a power operated device connected to said actuator for moving said actuator to shift the selected element, and power device controlling means connected to said actuator, said actuator operating said power device controlling means.

28. Mechanism of the character described comprising selective gear shifter elements, operating means including an actuator engageable to shift said elements, vacuum operated mechanism connected to said actuator for moving said actuator, and vacuum control means connected to said actuator in a manner to be operated thereby.

29. Mechanism of the character described comprising selective gear shifter elements, an actuator engageable to shift said elements, power operative mechanism including a piston and a control valve, means connecting said piston with said actuator for moving the same, means operatively connecting said actuator with said control valve, and manual means connected with said actuator to initially move said actuator.

30. Mechanism of the character described comprising selective gear shifter elements, an actuator engageable to shift said elements, power operative mechanism including a piston and a control valve, means connecting said piston with said actuator for moving the same, means operatively connecting said actuator with said control valve, and manual means connected with said actuator to initially move said actuator and to return said actuator and associated parts to starting position after having been moved by said power mechanism.

ELMER G. KESLING.